J. E. ELDRIDGE, W. B. AND C. E. BURGESS, AND C. N. ASHBEE.
MOTOR MOWER.
APPLICATION FILED MAR. 20, 1922.
1,428,154.
Patented Sept. 5, 1922.
2 SHEETS—SHEET 1.
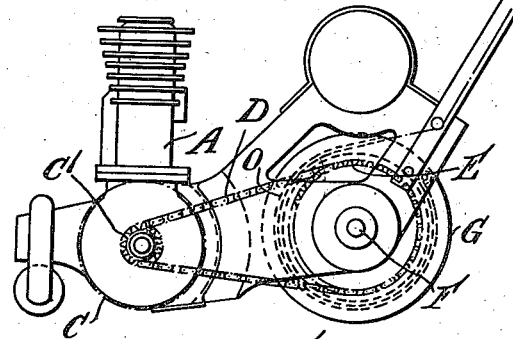
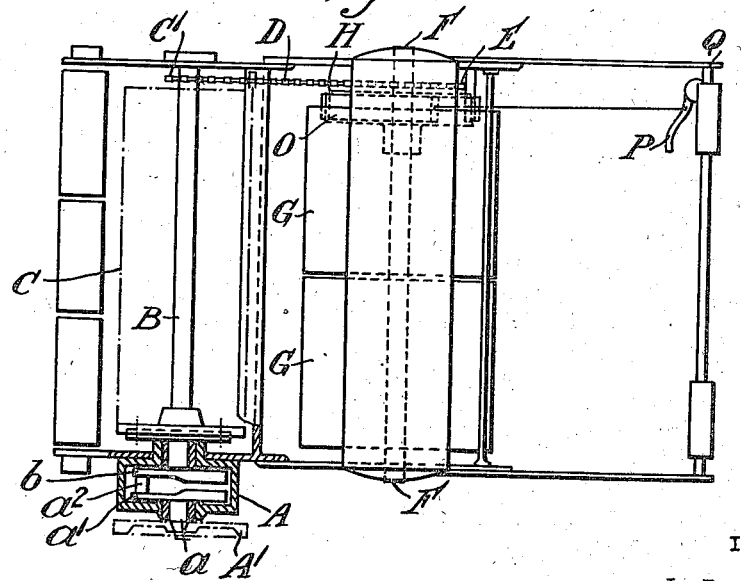
INVENTORS:
J. E. ELDRIDGE,
W. B. BURGESS,
C. E. BURGESS,
C. N. ASHBEE,
By their Attys., J. E. ELDRIDGE, W. B. AND C. E. BURGESS, AND C. N. ASHBEE.
MOTOR MOWER.
APPLICATION FILED MAR. 20, 1922.
1,428,154.
Patented Sept. 5, 1922.
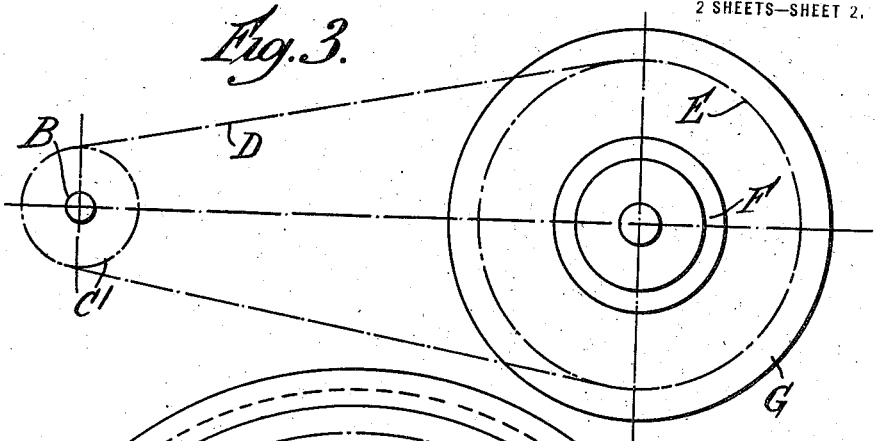
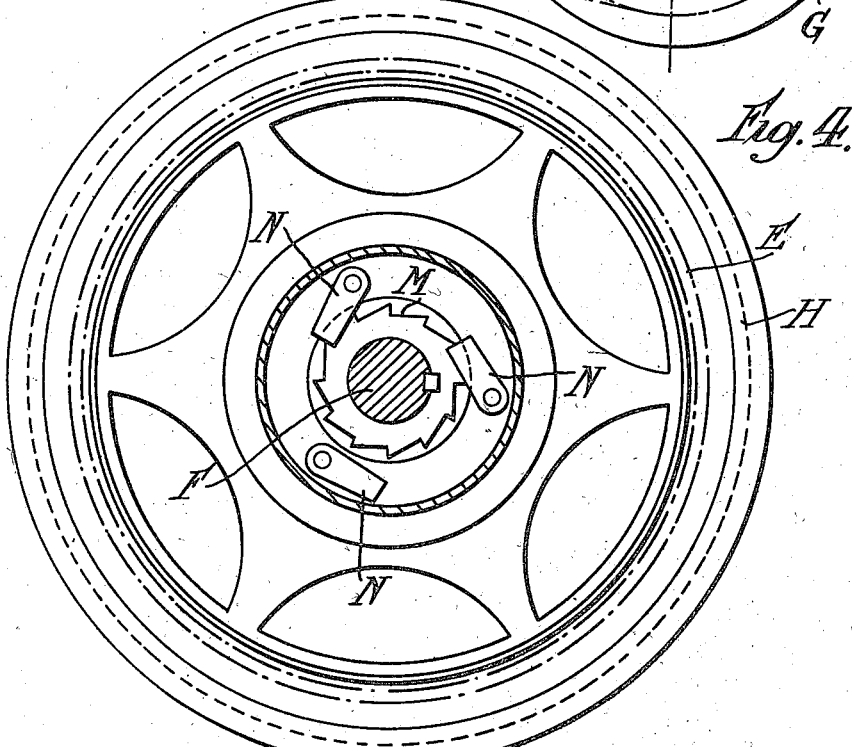
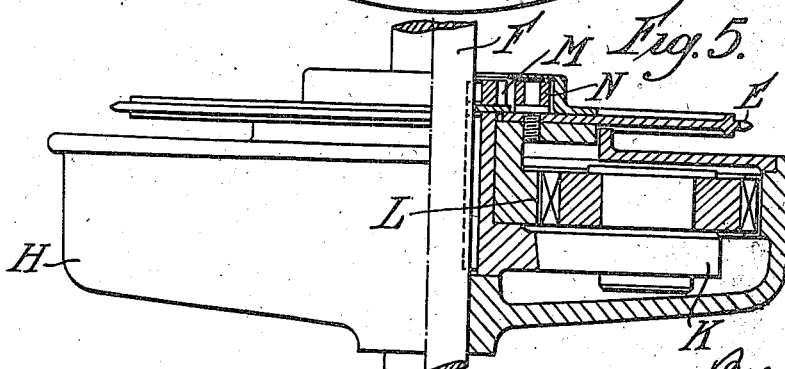
INVENTORS:
J. E. ELDRIDGE,
W. B. BURGESS,
C. E. BURGESS,
C. N. ASHBEE,
By their Attys.

Patented Sept. 5, 1922.

1,428,154

UNITED STATES PATENT OFFICE.

JAMES EDGAR ELDRIDGE, WILLIAM BOWER BURGESS, CHARLES EDWARD BURGESS, AND CLAUD NEVILLE ASHBEE, OF BRENTWOOD, ENGLAND.

MOTOR MOWER.

Application filed March 20, 1922. Serial No. 545,306.

*To all whom it may concern:*

Be it known that we, JAMES EDGAR ELDRIDGE, a subject of the king of Great Britain, residing at 252 Ongar Road, Brentwood, in the county of Essex, England, and WILLIAM BOWER BURGESS, CHARLES EDWARD BURGESS, and CLAUD NEVILLE ASHBEE, subjects of the King of Great Britain, residing at Victoria Works, Brentwood, in the county of Essex, England, have invented a new and useful Improvement in Motor Mowers, of which the following is a specification.

The object of this invention is to provide a motor mower of simple and cheap construction.

Our invention is illustrated by the accompanying drawings, Figure 1 of which is a side view and Figure 2 a plan of a mower constructed in accordance with this invention. Figure 3 is a view to a larger scale showing the chain drive between the rollers and the shaft of the cutting cylinder. Figure 4 is a side elevation partly in section and Figure 5 a plan partly in section, both these figures being drawn to a still larger scale, showing the gearing between the sprocket wheel and the roller axle.

A is an internal combustion motor whose crank shaft $a$ is coaxial with the shaft B of the cutting cylinder C. The crank shaft of the motor may be rigid with the shaft B or may be connected thereto through any convenient friction device which will obviate breakage should the cylinder C be stopped by a stone or other impediment. If such friction device is provided it is well to employ a fly wheel $A^1$ on the crank shaft of the engine. On shaft $a$ is a crank $a^1$ connected by a crank pin $a^2$ to a crank $b$ on shaft B. On the shaft B is a sprocket $C^1$ connected by a chain D to a sprocket E on the axle F of the rollers G, G. H is a brake drum which is loose on the axle F and has an internal ring of teeth I with which mesh pinions J carried by arms K keyed to the shaft F; these pinions also mesh with a ring of teeth L fast with the sprocket E. Keyed on the axle F is a ratchet M with which can mesh pawls N pivoted in the sprocket E. A brake band O surrounds the drum H and can be tightened thereon by a small handle P carried by the ordinary handles Q.

The machine is started by pushing it forward by the handles Q with the brake O off whereupon the ratchet M engages one of the pawls N and drives the sprocket E so that the cutting cylinder C is rotated; the engine is thereby turned. When the engine starts the sprocket E is driven faster than the axle F and the pawls N over-run the ratchet M, the brake drum H being rotated by the pinions J which revolve idly on the arms K, the brake is then applied to render the brake drum stationary, whereupon the rotation of the pinions J causes the arms K and therefore the axle F to turn so that the rollers are driven and the machine moves forward under the power of the engine.

It will be seen that when the engine is driven by the rollers through the free wheel the speed of the engine is less, relative to the rollers, than when the motor drives the rollers. It will also be seen that by loosening the brake band so as to free the drum the machine can be stopped from moving over the ground while the cutting cylinder is still rotating.

What we claim is:—

1. In a mower, the combination of a cutting cylinder having a shaft, a motor whose shaft is coaxial with that of the cutting cylinder and constitutes an extension thereof, and means for driving the cutting cylinder shaft from the motor shaft.

2. In a motor mower, the combination of a cutting cylinder having a shaft, a motor whose shaft is coaxial with that of the cutting cylinder and constitutes a continuation thereof, means for driving the cutting cylinder shaft from the motor shaft, a land roller, and means for driving the roller from the cutting cylinder, 3. In a motor mower, the combination of a cutting cylinder having a shaft, a motor whose shaft is coaxial with that of the cutting cylinder and constitutes an extension thereof, means for driving the cutting cylinder shaft from the motor shaft, a land roller, and a free wheel arrangement and friction clutch through which the roller can be driven from the cutting cylinder.

4. A motor mower comprising a motor, a cutting cylinder, a shaft formed in two coaxial parts, one of which constitutes the motor shaft and the other of which constitutes the cutting cylinder shaft, and means for driving the cutting cylinder shaft from the motor shaft.

5. A motor mower comprising a motor, a cutting cylinder, a land roller, a shaft formed in two coaxial parts, one of which constitutes the motor shaft and the other of which constitutes the cutting cylinder shaft, means for driving the cutting cylinder shaft from the motor shaft, and means for driving the land roller from the cutter cylinder shaft at will.

In testimony that we claim the foregoing as our invention we have signed our names this 7th day of March, 1922.

JAMES EDGAR ELDRIDGE.
WILLIAM BOWER BURGESS.
CHARLES EDWARD BURGESS.
CLAUD NEVILLE ASHBEE.